United States Patent [19]

Wang

[11] Patent Number: 5,087,493
[45] Date of Patent: Feb. 11, 1992

[54] DUST PROTECTOR

[76] Inventor: John Wang, No. 129, Tuan-Chu Lane, Tuan-Chu Li, Chiayi City, Taiwan

[21] Appl. No.: 601,447

[22] Filed: Oct. 22, 1990

[51] Int. Cl.$^5$ ............... B29D 23/18; F01B 19/00
[52] U.S. Cl. ........................... 428/36.9; 92/34
[58] Field of Search ............ 280/84, 280, 159; 92/34, 40; 428/36.9

[56] References Cited

U.S. PATENT DOCUMENTS 3,301,140 1/1967 Beck ............................... 92/34

Primary Examiner—James J. Seidleck
Assistant Examiner—Charles R. Nold
Attorney, Agent, or Firm—Fish & Richardson

[57] ABSTRACT

A dust protector includes a plurality of pleated units. Each pleated unit has a first and a second hollow truncated cone-shaped member. The converging ends of the first and second truncated cone-shaped members are joined together. The diverging end of the first truncated cone-shaped member has a first flange with annular groove which is engageable with a second flange of the diverging end of an adjacent second truncated cone-shaped member.

2 Claims, 2 Drawing Sheets

DUST PROTECTOR

BACKGROUND OF THE INVENTION

The invention relates to a dust protector, more particularly, to a dust protector used especially to cover a body of machine and hydraulic piston rod.

FIG. 1 shows a conventional dust protector of the prior art, which is used to sheath a hydraulic piston rod (A) or a body of a machine to protect it from dust. Accordingly, it is made of rubber material and includes a hollow collapsible tube member (1) having plurality of pleated units (11). Though such dust protector can cover a hydraulic piston rod, it has the following defects.

Since the dust protector is made by a molding process, it has an exact predetermined length. Therefore, it can cover only a piston rod of a certain size. To cover piston rods of differing lengths, more particularly of super length, several molds must be used, thus increasing the manufacturing cost.

SUMMARY OF THE INVENTION

Therefore, the main object of the present invention is to provide a dust protector which can cover a piston rod of any length.

Another object of the present invention is to provide a dust protector having a collapsible tube member including a plurality of pleats, produced by a single mold, so that the manufacturing cost is reduced.

Accordingly, a dust protector of the present invention includes a collapsible tube member having a plurality of pleated units. Each of the pleated units, includes a first and a second hollow truncated cone-shaped member. Each cone-shaped member has a converging end and a diverging end. The converging ends are joined together so that a flared portion is formed on either side of the joined portion. The first flared portion has an outwardly extending flange with an annular groove therein. The second flared portion has a outwardly extending second flange which is detachably engageable with the annular groove of the flange of the first flared portion.

In another embodiment, the diverging ends of the first and second truncated cone-shaped members are joined together, the converging end of the first truncated cone-shaped member has a flange with an annular groove. The converging end of the second truncated cone-shaped member has a second flange which is detachably engageable with the annular groove of the flange of the first truncated cone-shaped member.

BRIEF DESCRIPTION OF THE DRAWINGS

Other features and advantages of the present invention will become apparent in the following detailed description, including drawings, all of which show a non-limiting form of the present invention, and of which.

DETAILED DESCRIPTION OF THE PREFERRED EMBODIMENT

Figure 1:
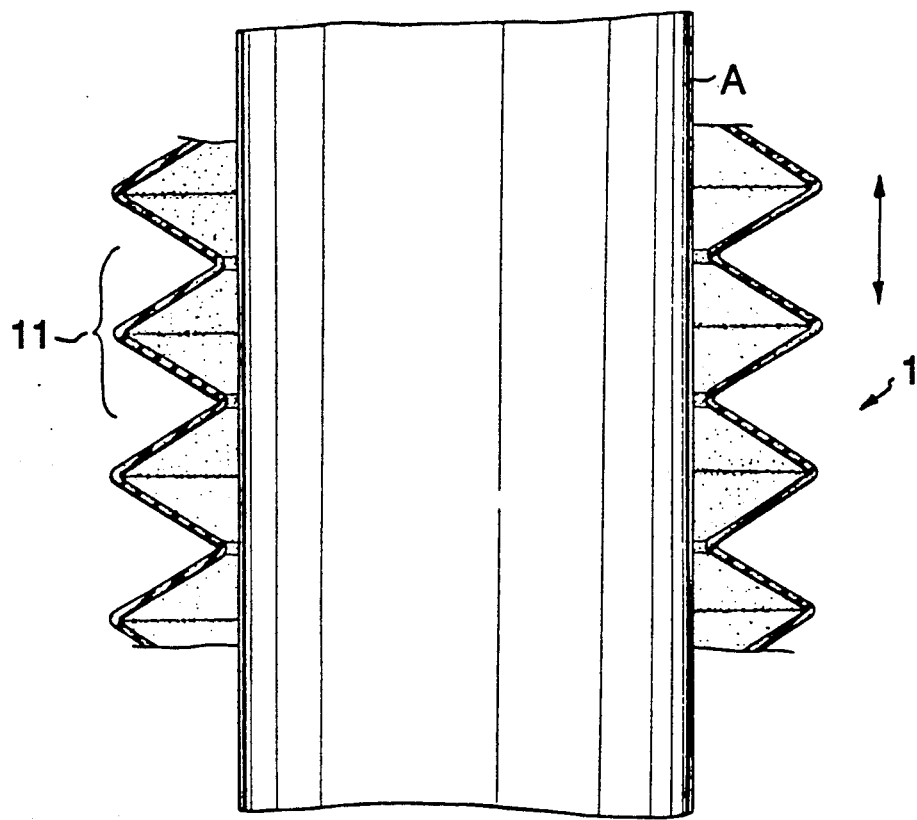
FIG. 1 shows a dust protector of the prior art.
Figure 2:
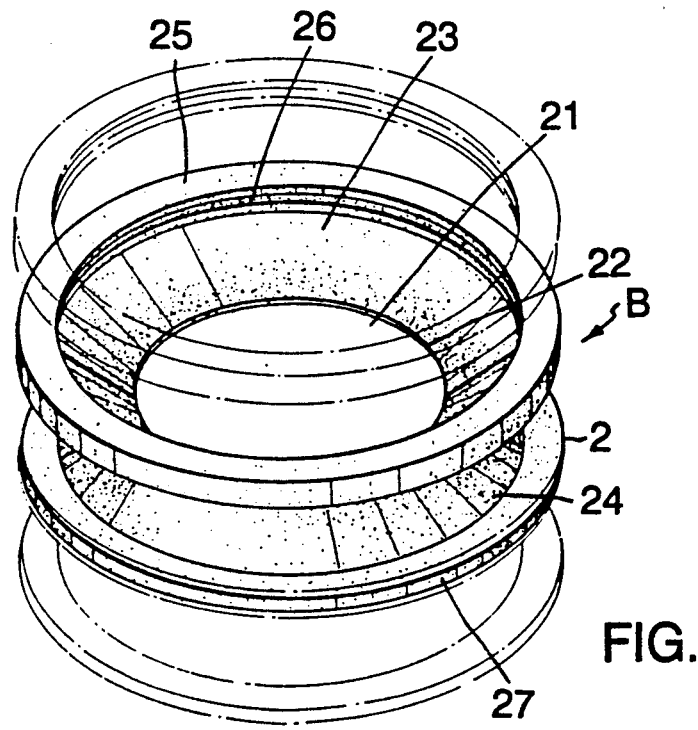
FIG. 2 is a perspective view of a dust protector according to the present invention.
Figure 3:
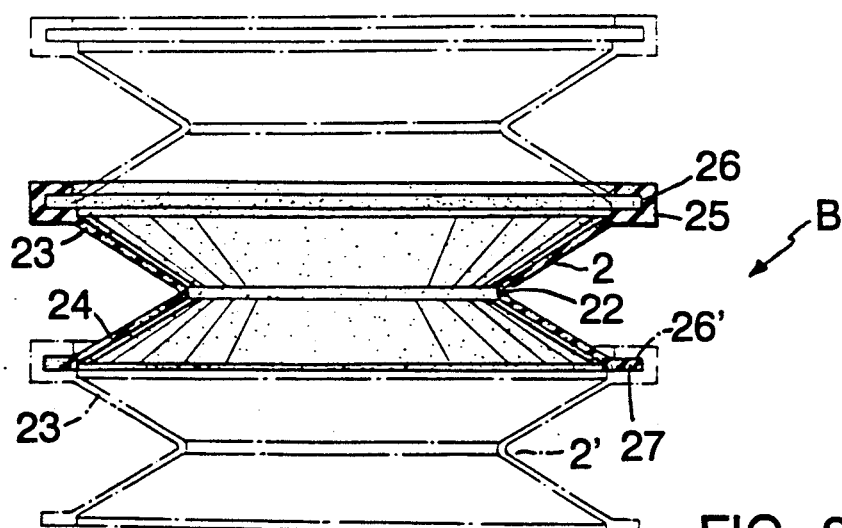
FIG. 3 shows a cross sectional view of a first preferred embodiment of a dust protector according to the present invention.

Referring to FIGS. 2 and 3, a dust protector (B) of the present invention includes a collapsible tube member mostly made of oil-resistant rubber or plastics. The collapsible hollow tube member includes a plurality of pleated units (2), which are detachably joined together so that a dust protector (B) is formed.

Figure 4:
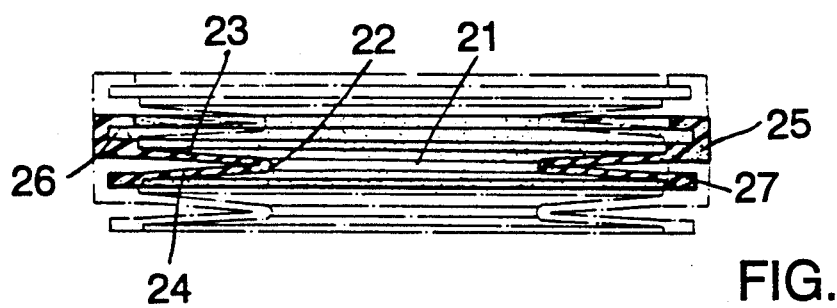
FIG. 4 shows a contracted configuration of a first preferred embodiment of a dust protector according to the present invention.

Each of the pleated units (2) includes a first and a second hollow truncated cone-shaped member (23) and (24). Each truncated cone-shaped member has a converging end and a diverging end. The two converging ends of the first and second truncated cone-shaped members are joined together and since they are hollow, an opening (21) is left through the joined portion (22). The two truncated cone-shaped members are axially extendible and collapsible with the joined portion (22) at the center. The diverging end of the first truncated cone-shaped member (23) has an outwardly extending first flange (25) with an annular groove (26) thereon. The diverging end of the second truncated cone-shaped member (24) has an outwardly extending second flange (27) which is adapted to detachably engage with the annular groove (26') of the first flange (25') of an adjacent first truncated cone-shaped member (23'), as shown in FIG. 3. When plurality of pleated units (2) are joined to form a dust protector in the stated manner, the dust protector is extendible and collapsible. FIG. 4 shows a dust protector of the present invention in a collapsed position.

Figure 5:
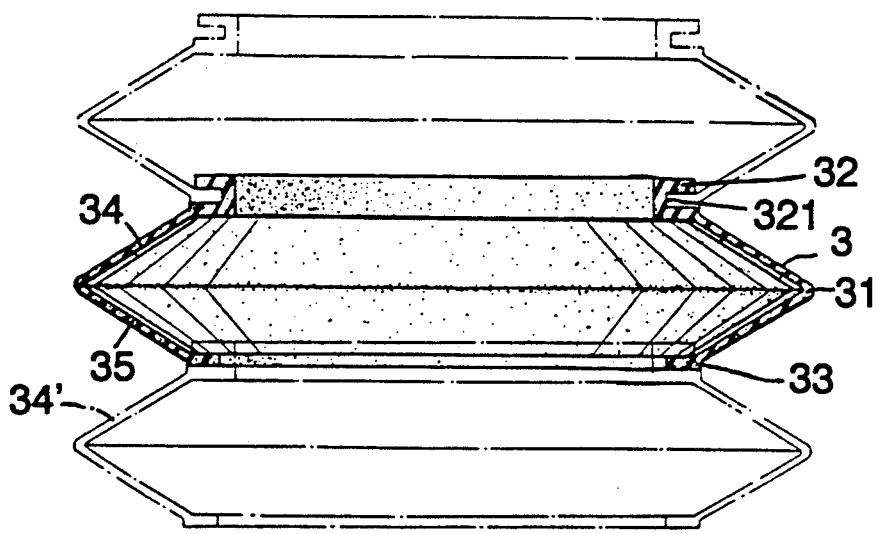
FIG. 5 shows a second preferred embodiment of a dust protector according to the present invention.

In another embodiment, the diverging ends of the first and second truncated cone-shaped members (34, 35) are joined together, and the mating annular groove (321) and the engageable ring (33) are respectively disposed on the converging ends of the hollow truncated cone-shaped members. FIG. 5 shows a dust protector according to such an embodiment.

Any number of pleated units (2) can be joined together to form a sleeve of any desired length, so that a dust protector of the present invention will fit a piston rod of any length. The pleated units can also be produced by a single mold, so that the expense of making differing molds, as was necessary in the prior art can be saved.

With the invention thus explained, it is obvious to those skilled in the art that various modifications and variations can be made without departing from the scope and spirit of the present invention, it is therefore intended that the invention be limited as indicated in the appended claims.

I claim:

1. A dust protector comprising:
   a hollow collapsible tube member having a plurality of pleated units detachably engaged with one another;
   each of said pleated units including a first truncated cone-shaped member and a second truncated cone-shaped member, each of said truncated cone shaped members having a converging end and a diverging end, said converging ends being joined together so that a first flared portion and a second flared portion are formed on either side of said joined converging ends, said first flared portion having a first flange with an annular groove therein, said second flared portion having a second flange which is adapted to detachably engage said annular groove of said first flange of said first flared portion of an adjacent first flared portion.

2. A dust protector comprising:
- a hollow collapsible tube member having a plurality of pleated units detachably engaged with one another;
- each of said pleated units including a first and a second truncated cone-shaped member, each of said truncated cone-shaped members having a converging end and a diverging end, said diverging ends of said first and said second truncated cone-shaped members being joined together, said converging end of said first truncated cone-shaped member having a first flange with an annular groove therein, said converging end of said second truncated cone-shaped member having a second flange which is adapted to detachable engage said annular groove of said first flange of said converging end of an adjacent first truncated cone-shaped member.

* * * * *